Patented Sept. 20, 1927.

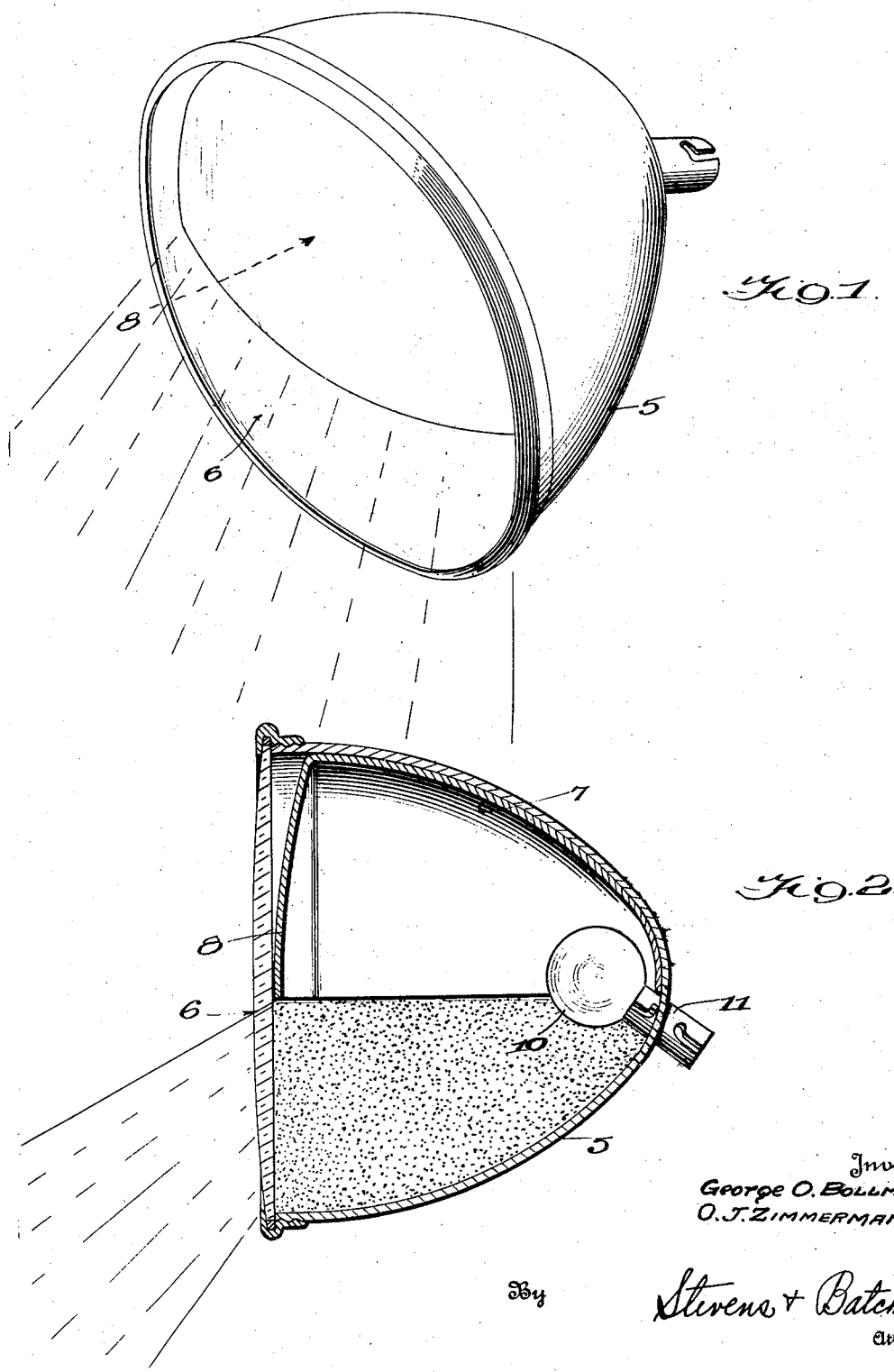

1,642,917

UNITED STATES PATENT OFFICE.

GEORGE O. BOLLMAN, OF NOKOMIS, AND OTTO J. ZIMMERMANN, OF OHLMAN, ILLINOIS.

VEHICLE LIGHT.

Application filed August 13, 1926. Serial No. 129,005.

This invention relates to lights especially adapted for use on automobiles in conjunction with or entirely separate from the headlights of conventional design.

Briefly stated, an important object of the invention is to provide an automobile light having effective means whereby the light rays from the same may be directed onto the roadway immediately in front of the vehicle at the point where the light is most needed and to avoid temporarily blinding the operator of approaching vehicles, the invention being especially adapted for use when it is desired to temporarily turn off the main headlights and to provide for the safe movement of vehicles past one another.

A further and equally important object of the invention is to provide a vehicle light which is of highly simplified construction, neat in appearance and which may, therefore, be applied to an automobile without marring the appearance of the same.

Other objects and advantages will be apparent during the course of the following description.

In the accompanying drawing forming a part of this application and in which like numerals are employed to designate like parts throughout the same, Figure 1 is a perspective of the improved light;

Figure 2 is a vertical sectional view through the same.

In the drawing wherein for the purpose of illustration is shown a preferred embodiment of the invention, the numeral 5 designates a substantially paraboloidal shell, the front end of which is provided with a transparent lens 6. The inner surface of paraboloidal shell 5 is covered with a non-reflective substance as indicated at 5ª.

In carrying out the invention a semi-paraboloidal reflector 7 is located within the upper half of the shell 5 and is provided at the front end thereof with a forwardly curved visor 8.

It will be seen that both the reflector 7 and the forwardly bulged visor 8 are located entirely within the shell 5 and are therefore protected from rain and the like by the shell and by the lens 6.

In carrying out the invention the light socket 11 is arranged adjacent the axis of the shell 5 and is extended upwardly at an angle of approximately 45 degrees to the horizontal axis of the shell and therefore supports the source of light 10 well up in the reflector 7. By thus supporting the light bulb 10 within the shell 5 blinding light rays from the light bulb or more particularly those light rays which would be likely to temporarily blind the driver from approaching vehicles are interrupted by the visor 8.

In operation the improved light is turned on when the vehicle equipped with the same is approaching another vehicle and the main headlights are turned off. When the improved light is turned on the light rays will be directed downwardly immediately in front of the vehicle and the blinding light rays will, as previously stated, be interrupted by the visor 8.

When the improved light is applied to an automobile it will be inconspicuous and will fill a definite need since adequate illumination at the point where it is most desired is supplied and the destructive light rays are effectively interrupted so that driving at night is rendered much safer than at present.

It is noted that the semi-paraboloidal reflector 7 is frictionally supported in place within the shell 5 by the lamp socket 11 at the rear and the lens 6 at the front. The visor 8 curves slightly in the direction of the lens 6 and rests thereagainst, the visor being compressed slightly to assure a snug fit against the contiguous wall of the shell at all points. Thus the reflector 7 may be held in place without the necessity of fastening screws or the like, although same can of course be used if desired.

Having thus described the invention, what is claimed is:

1. A light of the character specified comprising a paraboloidal shell, a reflector in the upper half of the shell and having a visor extending to a point adjacent the horizontal center of the shell, the reflector being in the shape of a semi-paraboloid, a lamp socket at the rear of the shell and supporting the rear edge of the reflector, and a lens detachably positioned over the front of said shell and engaging said visor to cooperate with said lamp socket in holding the outer wall portion of said reflector in close contact with the contiguous inner portion of said shell.

2. A light of the character specified comprising a paraboloidal shell having a non-reflecting lining, a reflector in the upper half of the shell and having a visor extending to a point adjacent the horizontal center of the shell, the reflector being in the shape of a semi-paraboloid, and being closely fitted in said shell, a light located within the reflector and directed upwardly at an angle of approximately 45 degrees, and said light being located above the plane of the axial center of said shell and above the plane of the lower edge of said visor.

3. A light of the character specified comprising a shell having a non-reflecting lining, a reflector in the upper half of the shell and having a visor extending to a point adjacent the horizontal center of the shell, the contiguous walls of the shell and reflector being of the same shape, means for holding said contiguous walls in close contact, and a light positioned entirely within said reflector whereby the light rays from the same are partially interrupted by said visor.

4. A light of the character specified comprising a shell having a non-reflecting lining, a reflector in the upper half of the shell and having a visor extending to a point adjacent the horizontal center of the shell, the contiguous walls of the shell and reflector being of the same shape, a light and socket therefor positioned entirely within said reflector whereby the light rays from the same are partially interrupted by said visor, means including said socket for holding the contiguous walls of said reflector and shell in close contact, and a lens at the front of the shell and enclosing the visor and the reflector.

In testimony whereof we affix our signatures.

GEORGE O. BOLLMAN.
OTTO J. ZIMMERMANN.